United States Patent [19]

Kubo et al.

[11] Patent Number: 4,499,225
[45] Date of Patent: Feb. 12, 1985

[54] COATING COMPOSITION

[75] Inventors: Akira Kubo, Sakura; Akihiko Ishii, Chiba; Ken Nishizaki, Narashino; Tomoharu Saito, Sakura, all of Japan

[73] Assignee: Shinto Paint Co., Ltd., Amagasaki, Japan

[21] Appl. No.: 511,294

[22] Filed: Jul. 6, 1983

[30] Foreign Application Priority Data

Jul. 8, 1982 [JP] Japan .................................. 57-118915

[51] Int. Cl.³ ............................................. C08L 91/06
[52] U.S. Cl. .................................... 524/276; 524/407; 524/417; 524/429; 524/443; 525/240
[58] Field of Search ................. 524/528, 276; 525/240

[56] References Cited

U.S. PATENT DOCUMENTS

| | | | |
|---|---|---|---|
| 3,247,141 | 4/1966 | Stryker et al. | 524/276 |
| 3,337,361 | 8/1967 | La Count | 524/276 |
| 3,629,186 | 12/1971 | Hill et al. | 524/528 |
| 3,639,189 | 2/1972 | Hartman | 525/232 |
| 3,666,500 | 5/1972 | Lange et al. | 524/276 |
| 3,793,243 | 2/1974 | Endros et al. | 524/276 |
| 4,039,507 | 8/1977 | Paige et al. | 524/528 |
| 4,058,409 | 11/1977 | Kesslin | 524/528 |
| 4,436,850 | 3/1984 | Burdick et al. | 524/8 |
| 4,440,899 | 4/1984 | Peerlkamp | 524/528 |
| 4,442,140 | 4/1984 | Kawabata et al. | 427/154 |
| 4,455,204 | 6/1984 | Pieslak et al. | 428/523 |

FOREIGN PATENT DOCUMENTS 1133156 10/1982 Canada .............................. 524/528

*Primary Examiner*—Joseph L. Schofer
*Assistant Examiner*—N. Sarofim
*Attorney, Agent, or Firm*—Wenderoth, Lind & Ponack

[57] ABSTRACT

A coating composition is provided herein prepared by dispersing in water a film-forming component comprising about 60–99 wt. % of a powder containing as a main component one or more resins selected from polyethylene, polypropylene and their derivatives and about 1–40% by weight of a low molecular weight oxidized polyethylene and/or derivatives thereof. This coating can be used for coating various electrical parts, automobile parts, etc., and the coatings have an excellent appearance, good chemical resistance, high insulation properties and good water resistance.

8 Claims, No Drawings

COATING COMPOSITION

The present invention relates to novel coating compositions comprising dispersing a powder in water, said powder containing one or more resins selected from the group consisting of polyethylene, polypropylene and their derivatives as a main component.

Application of a powder containing polyethylene, polypropylene and/or their derivatives as a main component to the coating field has so far widely been carried out in the production of electric parts, fences, automobile parts, equipments, etc., because the coatings that these resins form have good characteristics, such as a beautiful appearance, good chemical resistance, high insulation property, good water resistance and the like.

The most popularly employed coating methods for the above powder are fluidized bed coatings and electrostatic coatings, and in these methods, the powder is used in a so-called dry state.

Of these conventional methods, for example, in a fluidized bed coating, it is essential to heat the material to be coated before coating to obtain coating films of uniform film thickness, as well as good appearance and performance, particularly, at the upper and lower surfaces of the material. In ordinary cases, it is necessary to heat the material at 150° to 350° C. for several minutes.

Also, in electrostatic coating methods, the equipment cost is high in recent years in terms of pollution prevention as well as safety and sanitation, and furthr when a film thickness of about 300 $\mu$m is required, it is necessary to heat the material to be coated at temperatures of to 150° to 350° C. before coating. Further, when the materials to be coated have a complicated form, it is difficult to produce coated objects having a uniform film thickness because the thermal conductivity upon heating the material before coating is different at every part of the material, and thus the amount of powder, which adheres in a molten state to the material to be heated, varies from part to part.

The need to pre-heat materials to be coated at high temperatures in conventional powder coating processes in which the powder contains polyethylene, polypropylene and/or their derivatives as a main component is poor in adherence to the materials at room temperature.

From the standpoints of pollution prevention as well as safety and sanitation, a coating process using the powder in dispersion in water has been thought of, but the powder above, because of the few functional groups, is difficult to disperse in water by itself. Dispersion in water becomes possible by using various surfactants, but adherence to materials to be coated is not improved.

In view of this situation, the present inventors have studied extensively to find a coating composition which:

(1) does not diminish the usefulness of the above conventional powder containing as a main component one or more resins selected from the group consisting of polyethylene, polypropylene and their derivatives, (2) adheres to materials to be coated in an aqueous dispersion state as well as at room temperature, (3) produces a large film thickness and requires no high-temperature pre-heating, (4) is excellent in safety and sanitation, and (5) easily applied to coating, and as a result, found that all the above conditions (1) to (5) can be satisfied by mixing the above powder with a definite proportion of oxidized polyethylene and/or its derivative.

An object of the present invention is to provide coating compositions comprising dispersing a film-forming component in water, said film-forming component comprising 60 to 99 wt.% of a powder containing as a main component one or more resins selected from the group consisting of polyethylene, polypropylene and their derivatives, and 1 to 40 wt.% of a low molecular weight oxidized polyethylene and/or its derivative.

Next, the present invention will be illustrated in detail.

The powder used in the present invention constitutes the main component of formed coating film, and as polyethylene, the commonly well-known high-density, medium-density and low-density ones can be used, but medium.low-density, particularly low-density ones are preferred.

As to the polypropylene employed, the usual polypropylenes produced by the Natta-Ziegler method, etc. will do. As the derivatives of these resins, chlorinated or chlorosulfonated polyethylene or polypropylene or low molecular weight polyethylene (polyethylene wax) can be used.

In the composition of the present invention, the particle diameter of the powder is preferably 0.05 to 150 $\mu$m, particularly preferably 5 to 50 $\mu$m.

Also, the powder may be used in mixture with a rosin, aliphatic compounds, paraffin wax, machine oil, petroleum resins, linseed oil, epoxy resins, etc. for the improvement of its adherence, compatibility, weather resistance, economy and the like. Further, for the purpose of coloration, it may be used in a colored batch produced by kneading it with various pigments or dyes.

As the low molecular weight oxidized polyethylene and its derivative used in the present invention, any of those will do which have an acid group and are generally called polyethylene wax, if they have moderate viscosity and adherence at room temperature. Also, these low molecular weight materials should be such as to enable the foregoing powder to adhere to materials to be coated at room temperature by mixing said oxidized polyethylene and the powder together in a finely dispersed state in water, and also should have a good compatibility with the powder such as to permit the powder to display its original usefulness after baking and drying. As such low molecular weight oxidized polyethylene or its derivative, those having an acid value of not less than 10, particularly 20 to 80 as well as a molecular weight of 500 to 10,000, particularly 1,000 to 4,000, are preferred. When the oxidized polyethylene has a low acid value and a high molecular weight outside these ranges, it is difficult to disperse the polyethylene itself in water even by using a surfactant and/or a neutralizing agent, and besides, the stability of a coating composition obtained by blending the polyethylene with the foregoing powder also becomes poor.

Contrary to this, with oxidized polyethylene having a high acid value and a low molecular weight outside these ranges, the stability of the coating composition increases, but the performances of coating films obtained with this composition, for example water resistance, insulation property and the like become poor. Such polyethylene is therefore not preferred.

Oxidized polyethylene and/or its derivative having the required properties are available in the market, examples of these materials being Sanwax E-300 (Sanyo Chemical Industries, Ltd.), High-wax 4202-E (Mitsui Petrochemical Co. Ltd.), Bareco E-2020 Polywax (Petrolite Co.) and AC-polyethylene (Allied Chemical Co.).

The foregoing low molecular weight oxidized polyethylene and/or its derivative are soluble in hydrocarbon solvents (e.g. n-heptane, toluene, xylene), chlorine-containing solents (e.g. trichlene, carbon tetrachloride), ketone-type solvents and the like, but insoluble in hydrophilic solvents, alcohols, cellosolves, glycols, water and the like.

The foregoing low molecular weight oxidized polyethylene and/or its derivative are used as dispersions in water, and for this purpose, the following method may be used.

For example, there is given a method in which the low molecular weight oxidized polyethylene and/or its derivative are melted by heating, and after adding a surfactant, neutralizing agent, etc. to the melt, the mixture is diluted with hot water with stirring. The heat-melting temperature is about 100° to about 140° C., and as the surfactant, a cationic, anionic and nonionic type ones may be used. It is also possible to use a nonionic type surfactant and an alkaline neutralizing agent such as an amine, sodium hydroxide or the like in combination.

Further, in using the low molecular weight oxidized polyethylene and/or its derivative of the present invention, a diluent such as trichlene may be added in order to lower the viscosity, various pigments or dyes may be dispersed in them as a coloring agent, or various additives (e.g. plasticizers) may be added to them in terms of film formation, appearance, performance and the like.

When coating films having high anti-corrosive properties are required, various anti-corrosive pigments or agents, for example inhibitors such as lead chromate, zinc chromate, lead silicate, phosphorus-containing anti-corrosive agents, sodium nitrite and the like may be added.

This low molecular weight oxidized polyethylene and/or its derivative, which are in a state of aqueous dispersion as described above, are added to water together with the foregoing powder, whereby the both are mixed and dispersed in water to form the coating composition of the present invention. Required amounts of both of these materials are 60 to 99 wt.%, as solid content, for the powder, and 1 to 40 wt.%, as solid content, for the oxidized polyethylene and/or its derivative. When the content of the oxidized polyethylene and/or its derivative is less than 1 wt.%, sufficient viscosity and adherence can not be imparted to the powder, while when the content exceeds 40 wt.%, the hardness, water resistance, insulation property, etc. of the formed coating film become poor. Such contents are not therefore preferred.

In the coating composition of the present invention, the solid content of the film-forming component comprising the foregoing powder and the low molecular weight oxidized polyethylene and/or its derivative may properly be varied according to intended uses, but it is preferably about 5 to about 70 wt.%.

For applying the coating composition of the present invention, any of the usual coating methods, for example spray coating, dip coating, electro-coating, etc., may be used.

Next, the present invention will be illustrated with reference to the following examples.

EXAMPLE 1

An aqueous dispersion of oxidized polyethylene was prepared using the following components:

| | | |
|---|---|---|
| 1. | Low molecular weight oxidized polyethylene[*1] | 100 parts by weight |
| 2. | Solvent (mineral turpentine) | 10 parts by weight |
| 3. | Nonionic surfactant[*2] | 25 parts by weight |
| 4. | Diethanolamine | 4 parts by weight |
| 5. | City Water | 461 parts by weight |
| | Total | 600 parts by weight |

[*1]Low molecular weight oxidized polyethylene having an acid value of 22 and a molecular weight of 2,000 to 2,500 (trade name, San-wax E-300; produced by Sanyo Chemical Industries, Ltd.)
[*2]Nonionic surfactant (trade name, Surfynol No. 104; produced by Nisshin Kagaku Kogyo Co.)

The above low molecular weight oxidized polyethylene and a solvent were melted at 120° to 130° C. to make the mixture homogeneous. Thereafter, the temperature of the melt was decreased to 100° to 110° C., and a nonionic surfactant and diethanolamine were added thereto. City water pre-heated to 98° C. was then gradually added with stirring to obtain a milky white aqueous dispersion of the low molecular weight oxidized polyethylene.

Two hundred parts by weight of the aqueous dispersion of low molecular weight oxidized polyethylene thus obtained, 2,000 parts by weight of city water, 1,000 parts by weight of polyethylene powder (trade name, Flo-thene UF-80; high-pressure process low-density polyethylene powder produced by Seitetsu Kagaku Kogyo Co.) and 10 parts by weight of a coloring agent (trade name, SD-569; carbon produced by Dainippon Ink Co.) were mixed and dispersed in the order described above at room temperature to obtain a coating composition of the present invention having a solid content of about 32%.

TEST EXAMPLE 1

A cold rolled steel plate of room temperature, which was hung vertically as non-degreased, was air-spray coated with the coating composition of the present invention obtained in Example 1, and after spray coating, it was baked at 200° C. for 10 minutes. The coating film obtained by baking had a film thickness of about 200 μm on the average, a uniform and beautiful appearance had no pin holes, with excellent chemical resistance, insulation property and water resistance.

TEST EXAMPLE 2

Iron reinforcing rods for concrete of room temperature, as non-degreased, was dipped in the coating composition of the present invention obtained in Example 1, and after pulling it out, it was drained and dried at 120° C. for 5 minutes. After allowing the rod to cool, it was dipped again in said coating composition, and after pulling it out, it was baked at 200° C. for 10 minutes. The coating film obtained was uniform and had a film thickness of 350 μm. The coating contained no pin holes and had excellent chemical resistance and water resistance.

TEST EXAMPLE 3

An electro-coating bath was prepared by additionally adding 30 parts by weight of the aqueous dispersion of low molecular weight oxidized polyethylene used in Example 1 to 100 parts by weight of the coating composition of the present invention obtained in Example 1. Electro-coating of a zinc phosphate treated material was then carried out with the material as an anode at 200 V × 15 sec under a condition that an electrode ratio be 1:1, a distance between the electrodes be 13 cm and a bath temperature be 23° C.

The coated material was pulled out of the bath, washed with water and baked at 180° C. for 10 minutes. The obtained coating film had a thickness of 350 μm on the average, was smooth and had excellent water resistance.

COMPARATIVE EXAMPLE 1

| | |
|---|---|
| 1. Polyethylene powder*3 | 100 parts by weight |
| 2. Ethyl cellosolve (solvent) | 50 parts by weight |
| 3. Nonionic surfactant*2 | 2 parts by weight |
| 4. City water | 178 parts by weight |
| Total | 330 parts by weight |

*3High-pressure process low-density polyethylene powder (trade name, Flo-thene UF-80; produced by Seitetsu Kagaku Kogyo Co.)

A component 2 was first added to a component 1 and mixed with stirring. Thereafter, city water 4, to which a component 3 had previously been added, was gradually added to the above mixture with stirring and mixed to obtain a coating composition.

Using the coating composition obtained, spray coating was carried out in the same manner as in Test example 1. The coated paint slipped off the steel plate by slight vibration of the plate, so that it was quietly placed in a baking furnace kept at 200° C. After 10 minutes, the coated material was taken out, but a coating film was hardly observed on the steel plate, leaving only a little coating film at the lower part of the steel plate.

This may be considered to be due to the following: the adhesion of the polyethylene powder to the material to be coated could not be maintained because, the temperature of the material increased from room temperature, the water vaporized out of the material and the surfactant also vaporized at the same time, or because the viscosity of the composition was low and also because there was no compatibility.

What is claimed is:

1. A coating composition consisting essentially of a film-forming component dispersed in water, said film-forming component comprising 60 to 99 wt.% of a powder containing as a main component one or more resins selected from the group consisting of polyethylene, polypropylene and their derivatives and 1 to 40 wt.% of a low molecular weight oxidized polyethylene and/or its derivative.

2. A coating composition as claimed in claim 1, wherein the particle diameter of the resin powder is 0.05 to 150 μm.

3. A coating composition as claimed in claim 1, wherein the oxidized polyethylene or its derivative has an acid value of 10 or higher and a molecular weight of 500 to 10,000.

4. A coating composition as claimed in claim 1, wherein the total resinous solid content is 5 to 70% by weight.

5. A coating composition as in claim 1 wherein the total resinous solid content is 5 to 70% by weight, the resin has a particle size of 0.05 to 150 μm and the oxidized polyethylene or its derivative has an acid value of 10 or higher and a molecular weight of 500 to 10,000.

6. A coating composition as in claim 5 wherein oxidized polyethylene is employed as the low molecular weight component and one or more resins selected from the group consisting of polyethylene and polypropylene is used as the resin.

7. A coating composition according to claim 6 which also contains a plasticizer in amounts sufficient to enhance the film formation of the coating composition.

8. A coating composition according to claim 7 which also contains an anti-corrosive agent selected from the group consisting of lead chromate, zinc chromate, lead silicate, phosphorus-containing anti-corrosive agents and sodium nitrite.

* * * * *